(12) United States Patent
Hartman

(10) Patent No.: US 6,544,448 B2
(45) Date of Patent: Apr. 8, 2003

(54) TWO-PART COATED FOAM STRUCTURE

(75) Inventor: Steven Hartman, Erin (CA)

(73) Assignee: Industrial Thermo Polymers Limited, Brampton (CA)

( * ) Notice: Subject to any disclaimer, the term of this patent is extended or adjusted under 35 U.S.C. 154(b) by 0 days.

(21) Appl. No.: 09/779,533

(22) Filed: Feb. 9, 2001

(65) Prior Publication Data

US 2002/0009583 A1 Jan. 24, 2002

Related U.S. Application Data

(63) Continuation of application No. 09/456,995, filed on Dec. 7, 1999, now Pat. No. 6,312,630, which is a continuation of application No. 08/633,943, filed on Apr. 17, 1996, now Pat. No. 6,497,919.

(51) Int. Cl.[7] .............................................. B29C 44/20
(52) U.S. Cl. .................................... 264/45.9; 264/48
(58) Field of Search ........................ 264/45.9, 46.4, 264/46.1, 48

(56) References Cited

U.S. PATENT DOCUMENTS

| | | | | | |
|---|---|---|---|---|---|
| 3,331,900 A | * | 7/1967 | Thomas | ...................... | 264/45.9 |
| 3,713,762 A | * | 1/1973 | Oisugu | ...................... | 264/45.9 |
| 3,832,260 A | * | 8/1974 | Straughan et al. | ........... | 156/390 |
| 3,845,184 A | * | 10/1974 | Nackaerts | ...................... | 264/54 |
| 4,322,260 A | * | 3/1982 | Conlon | .................. | 156/244.12 |
| 4,518,557 A | * | 5/1985 | Wecker | ...................... | 264/45.9 |
| 4,600,461 A | * | 7/1986 | Guy | ...................... | 156/244.12 |
| 4,634,615 A | * | 1/1987 | Versteegh et al. | ......... | 428/34.9 |
| 4,755,408 A | * | 7/1988 | Noel | .......................... | 428/36.5 |
| 5,360,048 A | * | 11/1994 | Lauer | .......................... | 156/86 |
| 6,054,078 A | * | 4/2000 | Lauer et al. | ................. | 264/45.9 |
| 6,183,673 B1 | * | 2/2001 | Hartman | ...................... | 264/45.9 |
| 6,312,630 B1 | * | 11/2001 | Hartman | ...................... | 264/45.9 |

FOREIGN PATENT DOCUMENTS

WO    WO 95/10447    *    4/1995

* cited by examiner

Primary Examiner—Allan R. Kuhns
(74) Attorney, Agent, or Firm—Eugene J.A. Gierczak

(57) ABSTRACT

A foamed polyethylene product has an outer sheath of non-foamed polyethylene fused to an underlying foamed body portion. Preferably, the product is produced in an in-line method when the foam body is extruded and subsequently the skin is extruded directly on the body portion. This process only causes limited thermal degradation of an outer layer of the body portion which improves adhesion of the skin to the body portion.

10 Claims, 1 Drawing Sheet

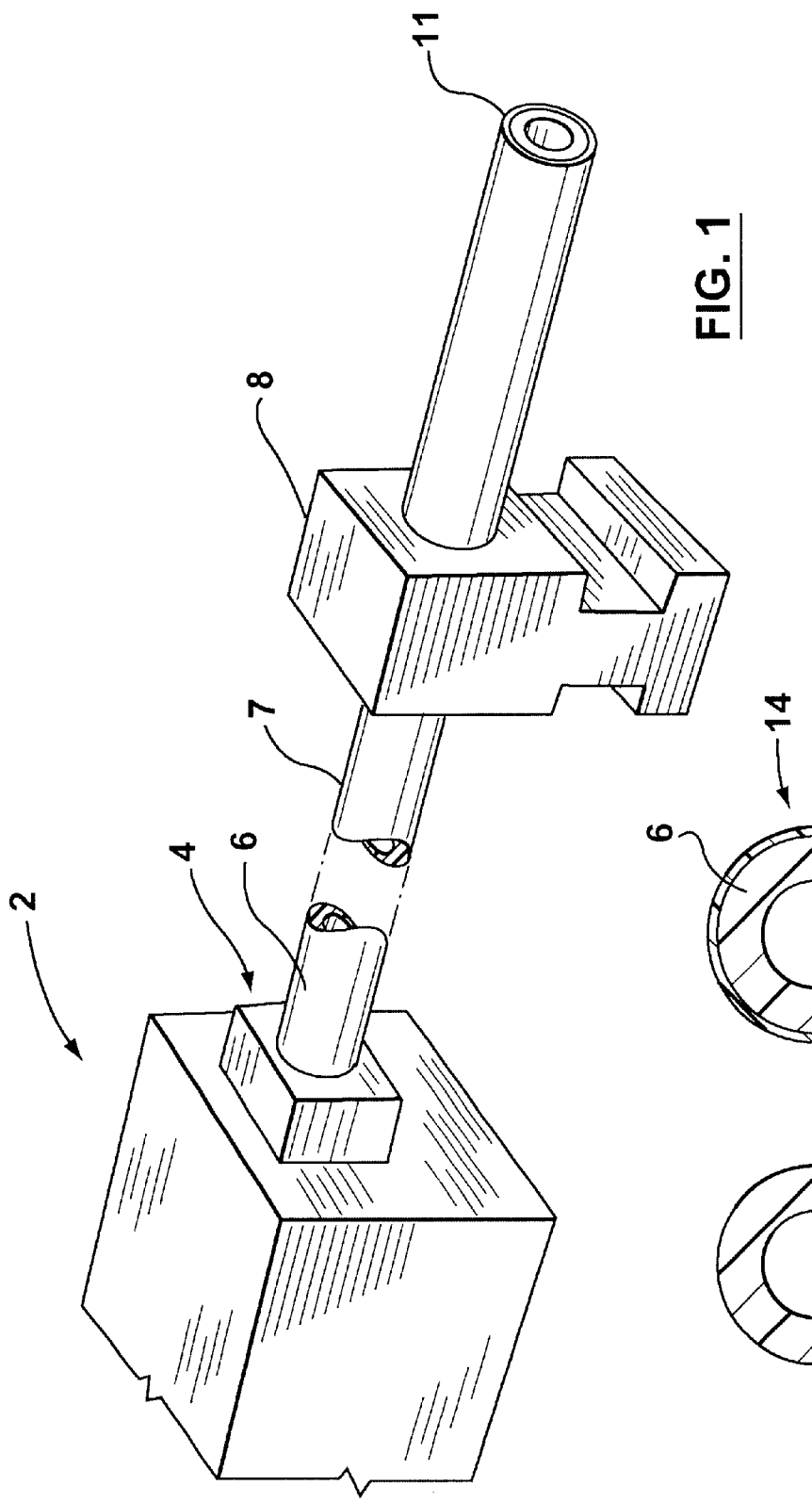

TWO-PART COATED FOAM STRUCTURE

This is a continuation of continuation Application Ser. No. 09/456,995 filed on Dec. 7, 1999, now U.S. Pat. No. 6,312,630 which in turn is a continuation of Application Ser. No. 08/633,943 filed on Apr. 17, 1996, now U.S. Pat. No. 6,497,919.

FIELD OF THE INVENTION

The present invention relates to foamed plastic products and in particular to foamed plastic products having an outer protective skin which is extruded onto a resilient foamed product. The present invention is also directed to a method of manufacturing of the product.

BACKGROUND OF THE INVENTION

Various types of foamed plastic products are known and many of these products are produced by an extrusion process and produce a body portion which is relatively soft and resilient. Foamed polyethylene extruded products have been used for pipe insulation and have also been applied about structural members to provide a resilient outer cushion member. For example, foamed polyethylene cushion members have been applied to supports of gymnastic equipment, playground equipment, football standards and basketball poles to reduce the possibility of injury by striking of the structural member.

Foamed polyethylene can be extruded in a number of different shapes and is very valuable for the type of applications described above. Unfortunately, the product is relatively soft, and thus, the outer surface can tear easily, even though there is a very thin skin portion produced at the outer surface of the product during the extrusion process. To overcome this problem, fabric or tape have been applied about the product, and thus, provides a further surface which protects the underlying polyethylene from damage.

It would be desirable to have a foamed polyethylene product which has a tougher outer surface and one which can be produced in a cost effective manner. Some solutions to the above problem have been proposed and one such solution involves using a separately foamed cylindrical sheath, which when exposed to heat shrinks about a product. The outer sleeves are placed about a polyethylene foamed product and then heat is applied to the sheath which then contracts to the diameter of the foamed polyethylene. This results in a two-stage process to marry the polyethylene foamed body and the outer sheath and it also requires somehow placing the foamed polyethylene body within the outer sheath. Examples of these types of structures and other arrangements are disclosed in U.S. Pat. Nos. 3,607,497, 3,813,372, 3,832,260, 4,634,615, 4,776,803, 4,780,158, 4,861,412, 4,950,352 and 5,360,048.

The present invention seeks to address the problems outlined above and produce a product which can be produced at lower cost.

SUMMARY OF THE INVENTION

A polyethylene product according to the present invention comprises a foamed body portion of polyethylene in combination with an outer skin of non-foamed thermal plastic polyethylene which is fused to the foamed body portion.

According to an aspect of the invention, the foamed body portion has a boundary layer which has undergone thermal degration and acts an intermediary securing by heat sealing the outer skin to the body portion.

According to a further aspect of the invention, the skin includes a significant amount of colour pigment and the body portion has no appreciable or consistent colour pigment. portion.

According to a further aspect of the invention, the outer skin includes a significant amount of ultraviolet stabilizers and the body portion does not have any significant amounts of ultraviolet stabilizers.

According to a further aspect of the invention, the polyethylene product with the body portion and the outer skin is of a generally cylindrical shape with an open central cavity which is placed about an elongate member, such that the elongate member is within the cavity whereby the polyethylene product provides an outer resilient sheath about the elongate body member.

A method of manufacturing, according to the present invention, produces a foamed polyethylene product having an outer tough sheath about a foamed polyethylene body portion. The method comprises extruding the foamed polyethylene body portion of a desired cross section, partially cooling the extruded body portion, and subsequently extruding a thin thermal plastic skin directly onto the body portion, resulting in fusing or heat sealing of the skin to an upper layer of the body portion, which due to the heat of the extruded skin, causes limited collapse of a boundary layer of the foamed body portion and securement of the skin to the body portion.

According to an aspect of the invention, the step of extruding the skin is conducted in-line with the step of extruding the polyethylene body portion and prior to complete cooling of the polyethylene body portion.

According to a further aspect of the invention, the method includes a step where the polyethylene body portion is pulled through a cylindrical extruding die which applies the extruded skin to the foamed body portion as it is pulled through the die.

According to a further aspect of the invention. The extruding die applies a skin having a thickness of approximately 0.003 inches.

According to a further aspect of the invention, the foamed body and the skin are of different colours.

According to yet a further aspect of the invention, the cylindrical die includes a control arrangement for adjusting the extrusion discharge rate from the cylindrical die and the method includes adjusting of the control arrangement to produce a desired outer skin thickness.

BRIEF DESCRIPTION OF THE DRAWINGS

Preferred embodiments of the invention are shown in

FIG. 1, which is a schematic view of the two-stage in-line extrusion process;

FIG. 2 is a cross sectional view of the foamed polyethylene body after the first stage of the extrusion process; and FIG. 3 is a cross sectional view of the final product.

DETAILED DESCRIPTION OF THE PREFERRED EMBODIMENTS

There are many known arrangement for extruding foamed polyethylene product and one such extruder is shown as 2 in the Figure. Product leaves the die of the extruder at 4 and almost immediately foam to full product dimensions, as generally indicated at 6. Thus, the foamed product 6, shortly downstream of the extruding die, is still relatively hot, but the outer skin 7 has formed and cooling is generally occurring from the outside in. Often, the extruded foamed polyethylene is exposed to cooling air or water cooling to reduce the time necessary to reduce the general temperature of the polyethylene foam. This foam has low thermal conductivity and this characteristic extends the time period required to fully cool the product. In any event, shortly downstream of the extrusion die 4, the polyethylene foamed product passes through the cross head sheath extruder 8. This extruder is basically a cylindrical ring through which the polyethylene foam is pulled and the cross head extrudes a skin onto the outer surface of the polyethylene foam using the foam for support.

Surprisingly, it was found that the cross head sheath extruder 8 can extrude a skin 11 directly onto the foamed polyethylene body 6 to produce the skinned product 14. Extruding of the skin onto the body portion 14 only causes a limited amount of thermal degradation in the polyethylene foam body, which thermal degradation assists in adhering or fusing the skin 11 to the body portion. It would seem that the excellent thermal insulating properties of the foamed body portion protect the underlying layers of the foamed body portion from the higher temperatures of the hot skin and allow sufficient time for the skin to cool. There is no appreciable collapse or loss in the overall shape of the product. In this way, there is very little damage to the foamed body portion and a tough, preferably polyethylene skin can be easily applied about the foamed body portion.

FIG. 2 slows the foamed product 6 before extruding the skin on the product and FIG. 3 shows the skinned polyethylene product 14.

A further feature of the present invention is the reduction in colour pigment that may be possible, in that the outer skin can have a very rich colour while the foamed body can be of a completely different color or be essentially void of any colour pigment. Furthermore, if the foamed core was made of recycled material, the colour of the body portion does not matter, as the outer sheath provides the finished surface.

Another advantage of the present invention is using this method to first extrude the polyethylene foamed body and then apply a polyethylene outer skin to the foamed body. Any waste product is of polyethylene and as such, can be recycled and reused as part of the material for extruding the polyethylene foamed body. Therefore, there is no waste material, as any scrap product can be recycled.

The outer skin can be of a material other than polyethylene such as polypropylene, surlyn, ethylene vinyl acetate, or other extrudable materials which, when extruded in this manner, become sufficiently secured to the polyethylene foam body.

The cross head sheath extruder 8 can have different cross heads for different types of product, for example larger product or smaller product, and different cross heads for different cross sections of product.

The foamed body portion 6 need not have a solid core and can have an open center, as would be the case with pipe insulation. This shape is most appropriate for feeding over an elongate structural member, such as a metal tube member or pipe member, and is particularly useful as a cover support member for a play structure. For example, it would be useful in protecting the support pole of a basketball hoop, for providing protection around a roll bar, for providing protection around play structures which have tubular members, such as climbing structures, and other similar types of applications.

The outer sheath also provides a very tough layer which allows other uses for the polyethylene foamed body portion. For example, this could be useful for boat bumpers or protective strips where the outer skin provides a toughness to the product which overcomes the problems associated with tearing of merely the body portion if it was used alone.

Another advantage of the present product is that the colour pigment can be concentrated in the outer skin and the inner foamed body does not need to have any particular colour pigment. This results in a cost saving and also allows a simple way to easily change the colour of the product during extrusion. For example, the line could be extruding one product having a black coating and at an appropriate time, the raw material for the cross head extruder could be replaced with a different raw material having a different colour pigment. There would be a short overlap where some scrap product may have to be recycled as the cross head extruder basically finishes extruding with the one colour and starts extrusion with the next, but the extrusion line can basically continue to run and there is no requirement to deal with changing colour regarding extruding of the foamed body portion.

A further advantage is that UV stabilizers can be placed in the outer skin and the inner foamed body does not need these stabilizers. This is important with respect to pipe insulation where the stabilizers significantly contribute to the cost of the product. By concentrating these UV stabilizers in the outer skin, i.e. the portion which is exposed to the sun, the body portion can be absent of these stabilizers in many cases, causing no appreciable effect on longevity of the product.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of manufacturing a two part structure having a foamed polyethylene member with an outer skin consisting essentially of extruding a foamed polyethylene body portion of a desired cross-section along an axial length thereof, partially water cooling said extruded foamed body portion and subsequently coaxially extruding a thermal plastic to form a single skin directly around the body portion, to fuse said skin coaxially to the outside surface of said body portion, using said foamed polyethylene body portion for support.

2. A method as claimed in claim 1 wherein said foamed body portion is pulled through a cylindrical die, which applies said extruded skin to said body portion as said polyethylene body portion is pulled through said die.

3. A method as claimed in claim 1 wherein said skin is non-foamed plastic.

4. A method of manufacturing a foamed plastic core extruded along an axial length thereof and having an outer skin consisting essentially of first extruding a core of a foamed plastic of a desired cross-section along an axial length thereof; partially water cooling said foamed plastic after said extrusion, by exposing said foamed plastic to water cooling means, then applying a heated thermal plastic to form a skin coaxially around and unto said axial length of said foamed plastic core so as to heat seal said skin to said foamed plastic core; using said extruded foamed plastic core for support; controlling the application of said skin to vary the thickness of said skin.

5. A method of manufacturing a composite of a foamed plastic core extruded along an axial length therefore and having an outer skin consisting essentially of:
   (a) extruding a core comprising a foamed plastic through an extruder die that foams to a desired dimension upon leaving said extruder die;
   (b) partially water cooling said foamed core leaving said extruder die by cooling means; and
   (c) then applying a hot skin co-axially around an outer surface of said axial length of said core so as to heat seal said skin to said core due to the heat of said extruded skin and form said composite.

6. A method as claimed in claim 5 wherein said foamed core leaves said extrusion die for exposure to the atmosphere.

7. A method as claimed in claim 5 wherein said core foams to a desired dimension.

8. A method as claimed in claim 5 including controlling the thickness of said skin applied co-axially around said outer surface of said core.

9. A method as claimed in claim 5 wherein said composite is formed without appreciable collapse or loss in cross-sectional shape of said composite.

10. A method as claimed in claim 5 wherein said step of applying the skin is conducted in line with the step of extruding said foamed core and prior to complete cooling of said foamed core.

* * * * *